Patented Jan. 1, 1929.

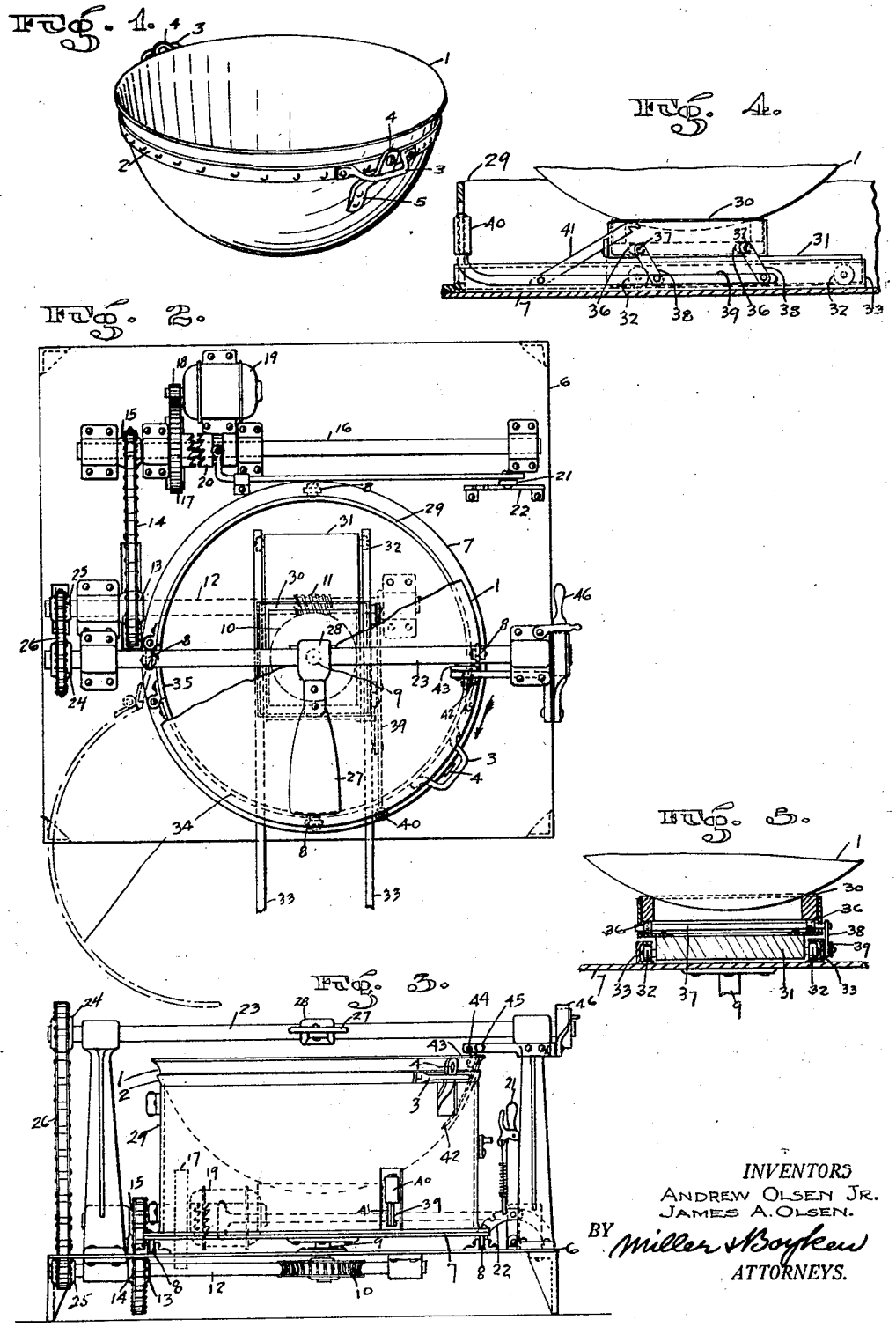

1,697,365

UNITED STATES PATENT OFFICE.

ANDREW OLSEN, JR., AND JAMES A. OLSEN, OF SAN FRANCISCO, CALIFORNIA.

CANDY-MIXING MACHINE.

Application filed January 9, 1928. Serial No. 245,294.

This invention relates to mixing machines as used especially for the mixing of stiff candy batches such as nut fudges, caramels and the like, or any other stiff mass material which is difficult to mix.

The objects of the invention are to provide a machine of the character described which will effectively mix stiff masses of material, provide for quick and easy loading and unloading of the apparatus, and a construction which will permit of easy cleaning of the mixing receptacle, as well as interchange of same from one grade of material to another.

In the candy business some grades of candy are mixed with nuts and then dumped out on long tables and leveled in the form of slabs to set or harden before being cut up, and one of the objects of the present invention is the provision of a removable mixing receptacle which may be quickly slung on a trolley hoist and rolled to any part of the drying room, dumped and returned for mixing a new batch, or carried away from the mixing paddle by hand.

Briefly described our invention comprises a mixing machine mounted on a frame complete with its drive motor and arranged with a horizontal shaft spaced above a revolving platform. A mixing receptacle (large copper bowl) is placed on the table under the shaft which it clears easily, and a single mixing paddle projecting from the shaft revolves in a vertical plane when the shaft is revolved so as to swing through the bowl, while the bowl itself is slowly revolved on the revolving platform.

Means are provided for locking the bowl in place, and for raising it from its seat, then rolling it horizontally from beneath the shaft so that it may be swung on the trolley hoist, or otherwise carried away.

In the drawings accompanying this application Fig. 1 is a perspective view of the mixing bowl or kettle. Fig. 2 is a plan view of the whole machine with bowl in place but broken away to reveal the platform beneath.

Fig. 3 is a front elevation of Fig. 2. Fig. 4 is an enlarged side elevation of the raising and lowering bowl supporting frame and carriage. Fig. 5 is a front sectional view of the carriage showing the shafts and cams which lift the bowl supporting frame.

In further detail the bowl 1 usually some three or four feet in diameter, is of substantially hemispherical shape with a somewhat flaring upper margin and rolled edge as indicated, and it is provided with a circumferential metal strap 2 riveted in place, a pair of handles 3 riveted to the strap and within each handle is a hoisting eye 4 formed on the end of a short tongue of metal 5 riveted vertically to the side of the kettle.

The machine proper comprises a frame 6 which is self-contained so as to be portable, and on which frame is mounted a revolvable platform 7 supported on idlers 8 and centralized by a vertical shaft 9. To the under side of the platform is secured a worm wheel 10 engaged by a worm 11 carried on a revolvably mounted shaft 12 for rotating the platform upon revolving of the shaft.

Shaft 12 is driven through means of a sprocket 13 and chain 14 from a smaller sprocket 15 carried on a shaft 16, in turn carrying a large gear 17 driven by a pinion 18 on a motor 19.

Gear 17 is loose on the shaft 16 and provided with a suitable clutch 20 operated by a hand lever 21 locked in or out in a suitable quadrant 22.

Across the center of the revolving platform and spaced high enough for the bowl 1 to slide under is a horizontal mixing or paddle shaft 23 driven from shaft 12 by means of sprockets 24—25 connected by chain 26.

Thus, upon throwing in the clutch 20 the platform will slowly revolve while the paddle shaft will slowly revolve above the platform.

The paddle shaft carries a stout paddle 27 preferably arranged with its flat side at right angles to its plane of rotation, and the blade, usually of wood, is bolted to a metal hub 28 so as to be easily removable, and the hub 28 is keyed to the shaft.

The revolving platform 7 is provided with a circular wall 29 of heavy sheet iron and is of an internal diameter to receive the bowl 1 with its flange or strap 2 resting upon the upper rim of the wall as indicated in Fig. 3, and when so positioned the revolving paddle in revolving will follow the curve of the bowl down one side and up the other side, as the center line of the shaft crosses substantially the center from which the spherical curve of the bowl is struck.

The bowl with a charge of hot candy mass is heavy and means are provided for quickly sliding it under or removing it from under the paddle shaft, so that it may be bodily rolled away on a trolley or otherwise for dumping, and the means here shown consists of a rolling carriage comprising an upper or bowl receiving frame 30 and a lower or supporting frame 31 provided with rollers 32 rolling on tracks 33 so that it may be rolled horizontally from under the shaft. The circular wall 29 is provided with a door 34—35 preferably made in two sections so as to clear the frame so that when the door is opened the carriage may be rolled either in or out, and when rolled in with bowl in position thereon the door is closed and latched to lock it around the bowl.

The height of the rolling carriage is such that the band 2 of the bowl is above the rim of the wall 29 and will clear it as the carriage is rolled in place, and after the door of the wall is closed and latched the carriage upper frame 30 is lowered from under the bowl so as to drop the bowl until it hangs within the wall with its band supported on the upper edge of the wall and perfectly centered with respect to the paddle.

To thus raise and lower the upper frame 30 of the carriage it is supported on cams 36 (see Figs. 4 and 5) secured to shafts 37 simultaneously operated by means of cranks 38 pivoted to a draw bar 39 provided with a handle 40.

An opening is left in the wall for handle 40 to project so that it may be operated to raise or lower the bowl, and a latch 41 is provided to lock the leverage system when the bowl is raised so that it will not fall as the carriage is rolled in or out of mixing position.

In operation the mixing bowl revolves in the direction of the arrow of Fig. 2 and the paddle successively passes through the bowl at every point as the bowl slowly turns.

To remove the accumulation of sticky candy mass from the inner margin of the bowl we provide a (preferably wooden) scraper blade 42 carried on a metal lug 43 pivoted at 44 to the frame so that it can be swung out of the bowl to permit rolling of same in or out of place, and the lug 43 is locked with scraper either raised or lowered by a catch 45.

When throwing off the power it is necessary that the paddle stop in a position to clear the bowl so that it can be rolled out, and to this end we provide a locking brake 46 which may be manually brought into action against the shaft collar when the clutch 20 is disengaged as soon as the paddle rises from the mass, and preferably moves to a vertical position over the bowl.

In considering the above disclosure it should be understood that though we only show one paddle on the shaft and which we have found sufficient for working nuts into candy masses, any number of paddles may be used, but they should be confined to one half of the field of rotation of the shaft so that the bowl will not have to be lowered a distance equal to the length of the paddles to permit lateral removal. Other changes coming within the spirit of the invention are intended to be covered in the appended claims.

We claim:

1. In a mixing machine of the character described, a horizontally disposed shaft, a mixing paddle mounted on said shaft and extending substantially at right angles therefrom to revolve in a vertical plane, a mixing receptacle positioned under said paddle and substantially centered with respect thereto with the shaft extending across the receptacle so that the paddle in revolving will descend into at one side of the receptacle and rise at the other, and said receptacle being laterally removable from position under said paddle.

2. In a mixing machine of the character described, a horizontally disposed shaft, a mixing paddle mounted on said shaft and extending substantially at right angles therefrom to revolve in a vertical plane, a mixing receptacle positioned under said paddle and substantially centered with respect thereto with the shaft extending across the receptacle so that the paddle in revolving will descend into at one side of the receptacle and rise at the other, said receptacle being of circular form in plan, and means for revolving said receptacle and said paddle simultaneously.

3. In a mixing machine of the character described, a mixing paddle mounted to revolve in a vertical plane, a mixing receptacle positioned under said paddle and substantially centered with respect thereto so that the paddle in revolving will descend at one side of the receptacle and rise at the other, said receptacle being of hemispherical internal form with the center of its arc substantially at the center of revolution of said paddle, means for suspending said receptacle in position and for revolving the receptacle from adjacent its upper edge.

4. In a mixing machine of the character described, a mixing paddle mounted to revolve in a vertical plane, a mixing receptacle positioned under said paddle and substantially centered with respect thereto so that the paddle in revolving will descend at one side of the receptacle and rise at the other, said receptacle being of hemispherical internal form with the center of its arc substantially at the center of revolution of said paddle, means for suspending said receptacle in position from adjacent its upper edge and means for raising and lowering it from supported position.

5. In a mixing machine of the character described, a mixing paddle mounted to revolve in a vertical plane, a mixing receptacle positioned under said paddle and substantially centered with respect thereto so that the paddle in revolving will descend at one side of the receptacle and rise at the other, said receptacle being of hemispherical internal form with the center of its arc substantially at the center of revolution of said paddle, means for suspending said receptacle in position from adjacent its upper edge comprising an annular wall adapted to engage the receptacle.

6. In a mixing machine of the character described, a mixing paddle mounted to revolve in a vertical plane, a mixing receptacle positioned under said paddle and substantially centered with respect thereto so that the paddle in revolving will descend at one side of the receptacle and rise at the other, said receptacle being of hemispherical internal form with the center of its arc substantially at the center of revolution of said paddle, means for suspending said receptacle in position from adjacent its upper edge comprising an annular wall adapted to engage the receptacle, and means for revolving said wall while supporting said receptacle.

7. In a mixing machine of the character described, a mixing paddle mounted to revolve in a vertical plane, a mixing receptacle positioned under said paddle and substantially centered with respect thereto so that the paddle in revolving will descend at one side of the receptacle and rise at the other, said receptacle being of hemispherical internal form with the center of its arc substantially at the center of revolution of said paddle, means for suspending said receptacle in position from adjacent its upper edge comprising an annular wall adapted to engage the receptacle, and means for revolving said wall while supporting said receptacle, a door in the side of said wall, and means for removing the receptacle laterally from under said paddle through the doorway provided by said door.

8. In a mixing machine of the character described, a horizontally arranged mixing shaft, a paddle thereon adapted to revolve in a vertical plane with said shaft, a mixing receptacle adapted for positioning by lateral sliding under said shaft when the paddle is raised, and a carriage upon which the receptacle is carried and rollable to position.

9. In a mixing machine of the character described, a horizontally arranged mixing shaft, a paddle thereon adapted to revolve in a vertical plane with said shaft, a mixing receptacle adapted for positioning by lateral sliding under said shaft when the paddle is raised, a carriage upon which the receptacle is carried and rollable to position, and means for locking said paddle in elevated position to clear said receptacle for lateral removal thereof.

10. In a structure as specified in claim 2, a scraper positioned against the inner side of said receptacle and means whereby said scraper is arranged to be raised therefrom.

11. In a mixing machine, a mixing receptacle having a hemispherical inner surface, and a circumferential supporting band projecting from its outer surface and a pair of handles on said band.

12. In a structure as specified in claim 8 a rotatable support on said machine and means for transferring the weight of the receptacle from said carriage to said rotatable support and vice versa.

13. In a structure as specified in claim 8 a rotatable support on said machine and means for transferring the weight of the receptacle from said carriage to said rotatable support and vice versa comprising a vertically movable frame on said carriage adapted to receive the receptacle, cam means adapted for raising and lowering said frame, and said rotatable support arranged to engage said receptacle from lowering of said frame to take its weight.

14. In a structure as specified in claim 8 a rotatable support on said machine and means for transferring the weight of the receptacle from said carriage to said rotatable support and vice versa comprising a vertically movable frame on said carriage adapted to receive the receptacle, cam means adapted for raising and lowering said frame, and said rotatable support arranged to engage said receptacle from lowering of said frame to take its weight, and means for simultaneously revolving said support and said paddle.

ANDREW OLSEN, Jr.
JAMES A. OLSEN.